(12) United States Patent
Lo et al.

(10) Patent No.: US 8,330,654 B2
(45) Date of Patent: Dec. 11, 2012

(54) METHOD AND APPARATUS FOR POSITIONING MOBILE DEVICE

(75) Inventors: Chi-Chung Lo, Zhuqi Township, Chiayi County (TW); Sheng-Po Kuo, Taipei (TW); Jui-Hao Chu, Luodong Township, Yilan County (TW); Yu-Chee Tseng, Hsinchu (TW); Lun-Chia Kuo, Taichung (TW); Chao-Yu Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 168 days.

(21) Appl. No.: 12/752,693

(22) Filed: Apr. 1, 2010

(65) Prior Publication Data

US 2011/0032152 A1 Feb. 10, 2011

(30) Foreign Application Priority Data

Aug. 10, 2009 (TW) .............................. 98126835 A

(51) Int. Cl.
*G01S 3/02* (2006.01)

(52) U.S. Cl. ....................................................... 342/457
(58) Field of Classification Search .................. 342/457
See application file for complete search history.

(56) References Cited

U.S. PATENT DOCUMENTS

| 6,208,936 | B1 | 3/2001 | Minor et al. |
| 6,317,688 | B1 | 11/2001 | Bruckner et al. |
| 6,522,266 | B1 | 2/2003 | Soehren et al. |
| 6,594,617 | B2 | 7/2003 | Scherzinger |
| 6,826,477 | B2 | 11/2004 | Ladetto et al. |
| 6,826,478 | B2 | 11/2004 | Riewe et al. |

(Continued)

FOREIGN PATENT DOCUMENTS

CN 1602020 3/2005

(Continued)

OTHER PUBLICATIONS

English language translation of abstract of TW 200630587 (published Sep. 1, 2006).

(Continued)

*Primary Examiner* — Harry Liu
(74) *Attorney, Agent, or Firm* — McClure, Qualey & Rodack, LLP

(57) ABSTRACT

A method for positioning a mobile device includes following steps. Based on a prior location point of the mobile device, many sample points are generated according to a prior probability distribution associated with the prior location point. A current moving track or a current moving status of the mobile device is obtained, and the sample points are updated according to at least one of the current moving track and the current moving status. A current estimated position is obtained based on a radio frequency signal received by the mobile device. A current probability distribution of the sample points corresponding to the radio frequency signal or the current estimated position is generated to obtain corresponding weights of the updated sample points. A current location point of the mobile device is obtained according to the weights and distribution of the sample points.

16 Claims, 4 Drawing Sheets

U.S. PATENT DOCUMENTS

| | | |
|---|---|---|
| 7,043,364 B2 | 5/2006 | Scherzinger |
| 7,053,830 B2 | 5/2006 | Krumm et al. |
| 7,055,601 B2 | 6/2006 | Barrow |
| 7,139,651 B2 | 11/2006 | Knowlton et al. |
| 7,289,906 B2 | 10/2007 | van der Merwe et al. |
| 7,305,303 B2 | 12/2007 | Soehren et al. |
| 7,312,752 B2 | 12/2007 | Smith et al. |
| 7,400,246 B2 | 7/2008 | Breeding |
| 7,409,290 B2 | 8/2008 | Lin |
| 7,454,290 B2 | 11/2008 | Alban et al. |
| 7,483,789 B1 | 1/2009 | Walters et al. |
| 2007/0116347 A1* | 5/2007 | Hong .................. 382/131 |
| 2007/0126634 A1* | 6/2007 | Bye .................... 342/451 |
| 2008/0162086 A1* | 7/2008 | Hsyu et al. ............ 702/189 |
| 2011/0032152 A1* | 2/2011 | Lo et al. .............. 342/450 |

FOREIGN PATENT DOCUMENTS

| | | |
|---|---|---|
| CN | 1666112 | 9/2005 |
| CN | 101009925 | 8/2007 |
| EP | 1 795 912 | 6/2007 |
| TW | 200630587 | 9/2006 |

OTHER PUBLICATIONS

Woodman, O., et al.; "Pedestrian Localisation for Indoor Environments;" ACM; 2008' pp. 1-10.

Widyawan, et al.; "A Novel Backtracking Particle Filter for Pattern Matching Indoor Localization;" ACM; 2008; pp. 5.

Fox, D., et al.; "Bayesian Filtering for Location Estimation;" Pervasive Computing; 2003; pp. 10-19.

Wendlandt, K., et al.; "Continuous Location and Direction Estimation with Multiple Sensors Using Particle Filtering;" pp. 1-6.

Krach, B., et al.; "Integration of Foot-Mounted Inertial Sensors into a Bayesian Location Estimation Framework;" pp. 1-7.

Chinese language office action dated Sep. 18, 2012.

English language translation of abstract of CN 1602020 (published Mar. 30, 2005).

English language translation of abstract of CN 1666112 (published Sep. 7, 2005).

English language translation of abstract of CN 101009925 (published Aug. 1, 2007).

* cited by examiner

METHOD AND APPARATUS FOR POSITIONING MOBILE DEVICE

This application claims the benefit of Taiwan application Serial No. 98126835, filed Aug. 10, 2009, the subject matter of which is incorporated herein by reference.

BACKGROUND

1. Field of the Disclosure

The disclosure relates in general to a method and apparatus for positioning a mobile device, and more particularly to a seamless and mixed method and apparatus for positioning a mobile device.

2. Description of the Related Art

Global Positioning System (GPS) is a system which locates the longitude and latitude coordinate information of an object globe-wide by using the satellite. The GPS is cheap and easy to access, and has better positioning efficiency in outdoor open field. However, the GPS still has some disadvantages like expensive hardware cost and time delay in first time positioning. Besides, due to existing restrictions, the GPS normally has poor or interrupted reception at high building, tunnel or indoor space. Thus, how to precisely position the user's position in an indoor environment has become an issue attracting wide discussion and study. Wherein, the method for positioning a user in an indoor environment by using the radio frequency (RF) signal is provided.

Examples of the positioning methods using the radio frequency signal such as the wireless network triangulation method and the wireless network pattern matching method normally are involved with the characteristic values or parameters such as time of arrival (TOA), angle of arrival (AOA) or the intensity of radio frequency signal. Wherein, the wireless network triangulation positioning method locates the user's position according to the distance between the user and many access points (AP) through mathematical or physical principles.

Besides, the wireless network pattern matching method locates the user's position through the comparison of characteristic values between the user's location and many access points. However, as the signal intensity decay mode is not easy to construct and the signal intensity is unstable, positioning drift may easily occur to the above positioning methods using the radio frequency signal, and such occurrence would generate illogical user moving paths. Besides, the above methods cannot effectively position 3D movements in a multi-story building.

SUMMARY OF THE DISCLOSURE

The disclosure is directed to a method and apparatus for positioning a mobile device. The positioning method performs positioning by sensing the moving track or moving status of a mobile device and using the radio frequency signal, and possesses both positioning accuracy and positioning efficiency when the positioning method is applied in a large-scaled environment.

According to an aspect of the present disclosure, a method for positioning a mobile device is provided. The method includes the following steps. Based on a prior location point of the mobile device, many sample particles are generated according to a prior probability distribution associated with the prior location point. A current moving track or a current moving status of the mobile device is obtained, and the sample points are updated according to at least one of the current moving track and the current moving status. A current estimated position is obtained based on a radio frequency signal. A current probability distribution of the sample points corresponding to the radio frequency signal or the current estimated position is generated to obtain corresponding weights of the moved updated sample points. A current location point of the mobile device is obtained according to the weights and distribution of the sample points.\\ According to another aspect of the present disclosure, a mobile device positioning apparatus is provided. The apparatus includes a receiver, a sensing feedback unit and a processor. The receiver is for receiving a radio frequency signal. The sensing feedback unit is for obtaining a current moving track or a current moving status of the mobile device. The processor is coupled to the receiver and the sensing feedback unit. Wherein, the processor generates a plurality of sample particles based on a prior location point of the mobile device according to a prior probability distribution associated with the prior location point, updates the sample particles according to at least one of the current moving track and the current moving status, determines a current estimated position based on the radio frequency signal, generates a current probability distribution of the sample particles corresponding to the radio frequency signal or the current estimated position to obtain corresponding weights of the updated sample particles, and determines a current location point of the mobile device according to the weights and distribution of the sample particles.

According to another aspect of the present disclosure, a mobile device positioning apparatus is provided. The apparatus includes a receiver, a sensing feedback unit and a processor. The receiver is for receiving a radio frequency signal. The sensing feedback unit is for obtaining a current moving track or a current moving status of the mobile device. The processor is coupled to the receiver and the sensing feedback unit. Wherein, the processor generates a plurality of sample points based on a prior location point of the mobile device according to a prior probability distribution associated with the prior location point, updates the sample points according to at least one of the current moving track and the current moving status, determines a current estimated position based on the radio frequency signal, generates a current probability distribution of the sample points corresponding to the radio frequency signal or the current estimated position to obtain corresponding weights of the updated sample points, and determines a current location point of the mobile device according to the weights and distribution of the sample points.

The disclosure will become apparent from the following detailed description of the preferred but non-limiting embodiments. The following description is made with reference to the accompanying drawings.

DETAILED DESCRIPTION OF THE DISCLOSURE

The disclosure provides a method and apparatus for positioning a mobile device. The positioning method performs positioning by sensing the moving track or the moving status of a mobile device and using the radio frequency signal, hence decreasing positioning drift, increasing positioning accuracy, and boosting positioning efficiency when the positioning method is applied in a large-scaled environment.

Figure 1:
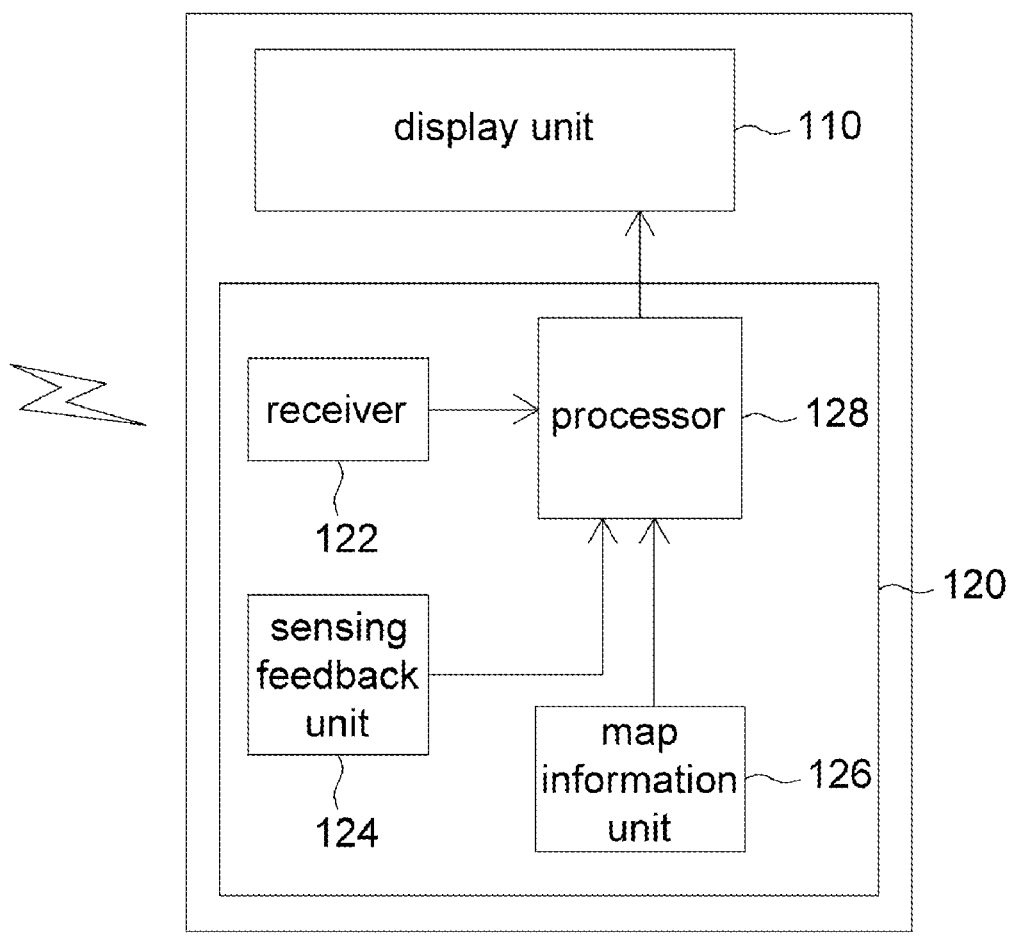
FIG. 1 shows a block diagram of an example of a mobile device according to a preferred embodiment of the disclosure.

The mobile device positioning apparatus of the disclosure can function independently or function in coorporated with various mobile devices, such as a mobile phone, a personal digital assistant or a navigation device. The mobile device positioning apparatus being incorporated with a mobile device is exemplified below. Referring to FIG. 1, a block diagram of an example of a mobile device according to a preferred embodiment of the disclosure is shown. The mobile device 100 includes a display unit 110 and a mobile device positioning apparatus 120. The mobile device positioning apparatus 120 displays the obtained position of the mobile device 100 on the display unit 110 in the form of text or picture.

The mobile device positioning apparatus 120 includes a receiver 122, a sensing feedback unit 124, a map information unit 126 and a processor 128. The receiver 122 is for receiving a radio frequency signal, such as a global positioning system (GPS) signal, a WiFi signal, a Zigbee message, a GSM signal, a Bluetooth signal or other radio frequency signals, and no particular restriction is applied here. The sensing feedback unit 124 is for obtaining a current moving track or a current moving status of the mobile device 100. The map information unit 126 is for storing and providing map information, and no particular restriction is applied here. The map information can also be transmitted to the receiver 122 from an external server, and then the receiver 122 further provides the map information to the processor 128 so as to save cost for the map information unit 126. That is, the map information unit 126 substantially is an option element. The processor 128 is coupled to the receiver 122, the sensing feedback unit 124 and the map information unit 126.

Based on a prior location point of the mobile device 100, the processor 128 generates many sample points according to a prior probability distribution associated with the prior location point. The processor 128 further updates the sample points according to at least one of the current moving track and the current moving status. That is, the processor 128 may update the sample points according to one or both of the current moving track and the current moving status. Then, based on the radio frequency signal, the processor 128 determines a current estimated position, generates a current probability distribution of the sample points corresponding to the radio frequency signal or the current estimated position to obtain corresponding weights of the updated sample points. Afterwards, the processor 128 determines a current location point of the mobile device 100 according to the weights and distribution of the sample points.

Figure 2:
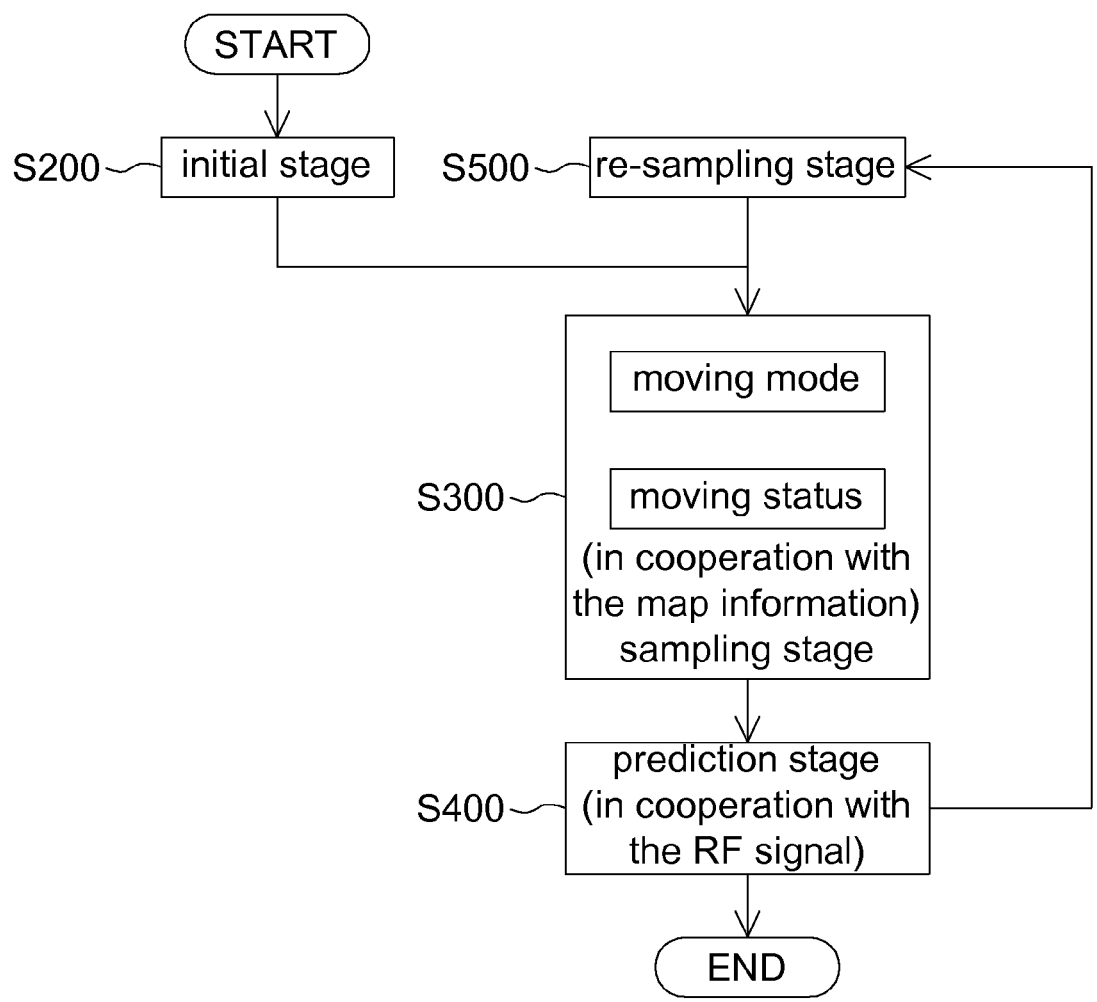
FIG. 2 shows a flowchart of the method for positioning a mobile device according to a preferred embodiment of the disclosure.

Referring to FIG. 2, a flowchart of the method for positioning a mobile device according to a preferred embodiment of the disclosure is shown. In the initial stage S200, the mobile device positioning apparatus 120 performs first time positioning to the mobile device 100. Based on an initial status of the mobile device 100, the processor 128 generates many sample points in a sample space, wherein the sample points can be scattered in the sample space randomly or in a fixed form such as a matrix. Let the sample points be scattered randomly be taken for example, but the disclosure is not limited thereto. As the positioning is a first time positioning, the sample points, corresponding to the initial status, are set to have the same weight.

Next, the method proceeds to the sampling stage S300, the sample points are randomly updated. Then, the method proceeds to the prediction stage S400, based on the radio frequency signal received by the receiver 122, the processor 128 determines an initial estimated position, which can be obtained by many positioning methods using the radio frequency signal (such as the wireless network triangulation method or the wireless network pattern matching method). The processor 128 generates an initial probability distribution of the sample points corresponding to the radio frequency signal or the initial status to obtain corresponding weights of the updated sample points, and determines a first location point of the mobile device according to the weights and distribution of the sample points. The first positioning procedure terminates here. Wherein, the processor 128 generates the probability distribution corresponding to the radio frequency signal by comparing the radio frequency signal with multiple characteristic values stored in an internal or an external database.

Figure 3:
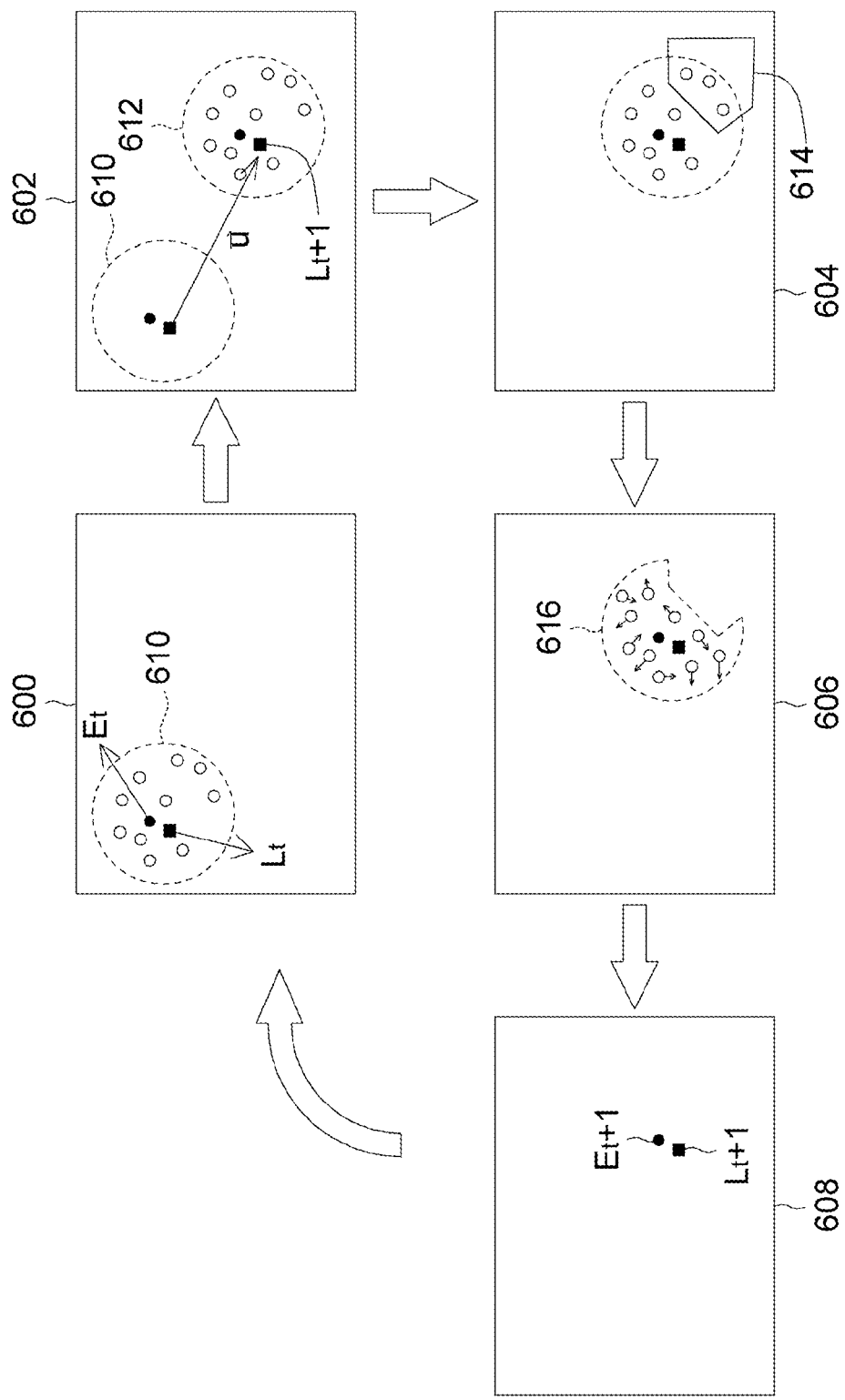
FIG. 3 shows an illustration of the method for positioning a mobile device according to a preferred embodiment of the disclosure.

For the mobile device 100, the location point obtained in the t-th positioning procedure is a prior location point of the (t+1)-th positioning procedure, wherein t is a positive integer. Referring to FIG. 3, an illustration of the method for positioning a mobile device according to a preferred embodiment of the disclosure is shown. After the t-th positioning procedure is completed, the method proceeds to the re-sampling stage S500, based on a prior location point $E_t$ (shown in the stage 600 of FIG. 3) of the mobile device 100 obtained in the t-th positioning procedure, many sample points are generated and scattered randomly (in a fixed form may also do) in a sample space 610 according to a prior probability distribution of the sample points associated with the prior location point $E_t$. As the prior probability distribution may be Gaussian distribution or normal distribution, the weights of the sample points are not exactly identical. As the prior probability distribution are associated with sample points, in the t-th positioning procedure, the points whose probabilities are too low will be filtered and will not have sample points.

Figure 4:
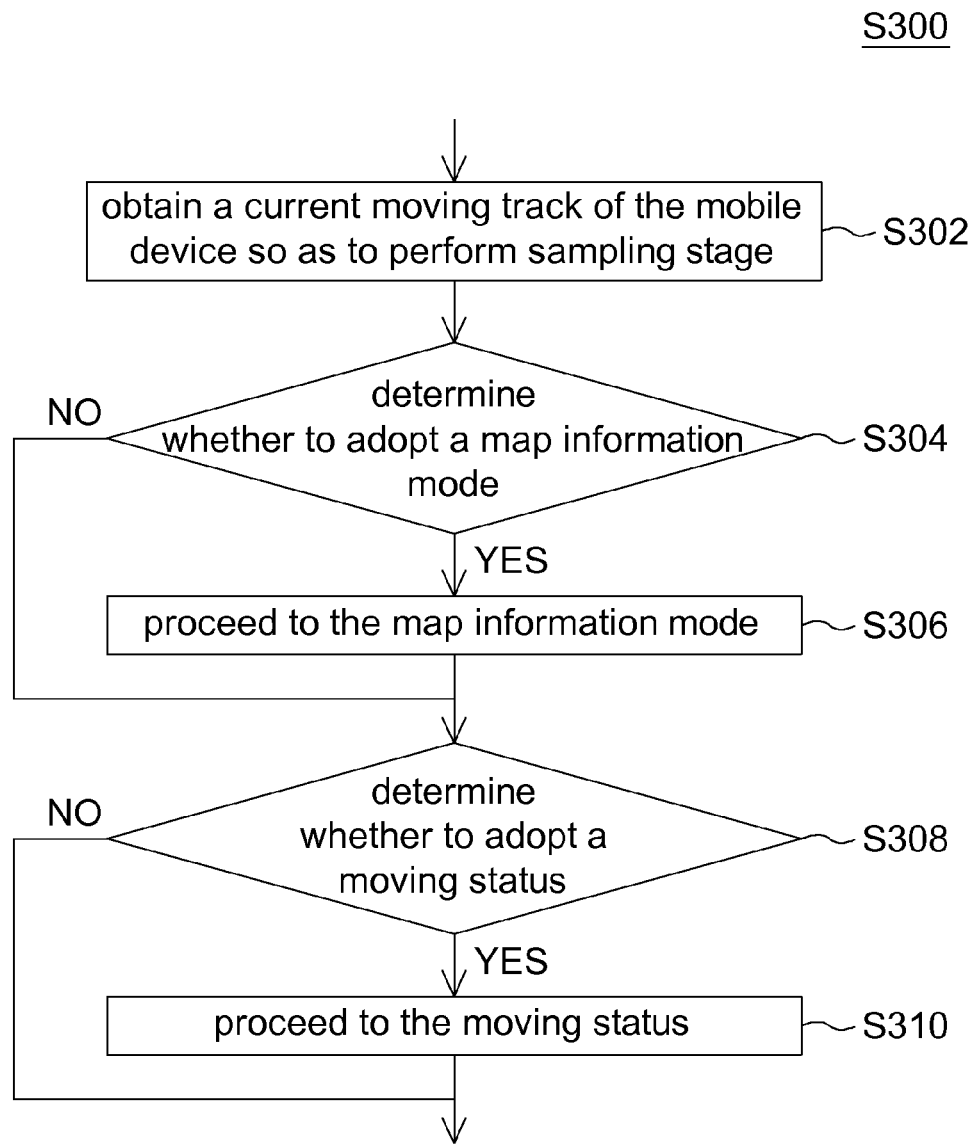
FIG. 4 shows a detailed flowchart of the sampling stage S300 of the method for positioning a mobile device according to a preferred embodiment of the disclosure.

Referring to FIG. 4, a detailed flowchart of the sampling stage S300 of the method for positioning a mobile device according to a preferred embodiment of the disclosure is shown. The sampling stage S300 receives many sample points of the initial stage S200 or the re-sampling stage S500. In step S302, the sensing feedback apparatus 124 determines a current moving track $\vec{u}$ of the mobile device 100 (as indicated in the stage 602 of FIG. 3, the mobile device 100 has moved to the actual position $L_{t+1}$ from the actual position $L_t$), and the sample points are updated according to the current moving track $\vec{u}$. In step S302, the sensing feedback apparatus 124 determines the current moving track $\vec{u}$ by using inertia elements such as the acceleration sensor, the north-directing sensor and the acceleration sensor, or the angle acceleration sensor and the acceleration sensor. Besides, the sensing feedback apparatus 124 may also obtain the current moving track $\vec{u}$ by calculating the moving trend data of the mobile device 100. Furthermore, the sensing feedback apparatus 124 may obtain the current moving track $\vec{u}$ by calculating the data of movements sensed by the external sensing elements (such as the sensors installed at the entrance of an indoor space).

Corresponding to stage 602 and step S302, each sample point in the sample space 610 can move the current moving track $\vec{u}$ and becomes scattered to obtain a sample space 612. Each sample point in the sample space 610 can also perform a conic random divergent projection according to each sample point in the sample space 610 and becomes scattered to obtain the sample space 612. That is, no particular restriction is applied to the implementations of updating sample points according to the current moving track $\vec{u}$. The sample points can be scattered around the actual position $L_{t+1}$ of the moved mobile device 100 through the current moving track $\vec{u}$ and will not be scattered in a mess, therefore the overall positioning accuracy is increased.

Afterwards, in step S304, the processor 128 determines whether to adopt the map information mode. If yes, the method proceeds to step S306, otherwise, the method proceeds to step S308. If the map information mode is adopted, then the processor 128 determines whether the moving paths of the sample points are logical or not according to the received map information after the sample points are updated according to the current moving track $\vec{u}$. If the moving paths of the sample points are illogical, then the processor 128 removes the sample points corresponding to illogical paths. As indicated in the stage 604 of FIG. 3, due to the existence of the obstacle 614 (such as a wall), a part of the sample points are removed because the corresponding moving paths are illogical. Afterwards, the processor 128 will add sufficient amount of sample points. Besides, after the current moving track $\vec{u}$ is obtained, the processor 128 can also update sample points according to the association between the current track $\vec{u}$ and the map information to avoid the occurrence of illogical moving paths.

The practice of updating the sample points by the processor 128 according to the association between the current moving track $\vec{u}$ and the map information is applicable to position a user who is moving in a 3D space of a multi-story building. That is, the current moving track $\vec{u}$ can be a moving track of the mobile device 100 on a 2D plane or in a 3D space. For example, in cooperation with the map information, the processor 128 can activate the setting of the floor at a staircase or an elevator, and determines the moving track through the sensing feedback apparatus 124 according to the change in the g value sensed by the g sensor. Thus, the sample points can be scattered towards different floors, and the problem of positioning a user who is moving in a 3D space of a multi-story building is thus resolved.

In the stage 606 of FIG. 3, the sample points are randomly updated and scattered in the sample space 616 (the current stage can be omitted if the sample points are scatted in a fixed form). Meanwhile, in step S308, the processor 128 determines whether to adopt the moving status. If yes, the method proceeds to step S310, the processor 128 analyzes the obtained current moving track $\vec{u}$ to obtain the current moving status, and adjusts the sample points according to the current moving status. Wherein, the processor 128 analyzes the current moving track $\vec{u}$ to determine whether the mobile device 100 is moved fast, normally or slowly. If the mobile device 100 is moved fast, normally or slowly, then the sample points are randomly adjusted, and the distance of movement can be adjusted according to the state of movement.

That is, the sample points are scattered in different sample space 616 corresponding to different current moving status of the mobile device. Besides, the processor 128 can narrow the sample space by manual setting around the area, in which errors in positioning may easily occur, so as to reduce drift.

Then, the method proceeds to prediction stage S400, based on the radio frequency signal received by the receiver 122, the processor 128 determines a current estimated position, which can be obtained by many positioning methods using the radio frequency signal (such as the triangulation method using the GPS signal or the pattern matching method using the WiFi signal). The processor 128 generates a current probability distribution of the sample points corresponding to the radio frequency signal or the current estimated position to obtain corresponding weights of the updated sample points, wherein the corresponding weight of each sample point can be the probability of the current probability distribution or a new weight obtained by adjusting the prior weight according to the probability of the current probability distribution. The current probability distribution is such as Gaussian distribution. The higher the weight, the higher the probability of the mobile device 100 locating on the position corresponding to the sample particle. To the contrary, the lower the weight, the lower the probability of the mobile device 100 locating on the position corresponding to the sample particle. Thus, the processor 128 determines a current location point $E_{t+1}$ of the mobile device 100 according to the weights and distribution of the sample points. Wherein, the processor 128 can select the sample point with highest weight as the current location point $E_{t+1}$, or select the central position of the sample points with first K highest weights as the current location point $E_{t+1}$, but it is not limited thereto. Thus, the overall positioning accuracy is increased. The (t+1)-th positioning procedure terminates here. A cycle of steps S300~S500 is repeated in each time of positioning procedure.

The method and apparatus for positioning a mobile device disclosed in above embodiments of the disclosure have many advantages exemplified below:

According to the method and apparatus for positioning a mobile device disclosed in the disclosure, the point filter algorithm succeeds many positioning methods using the radio frequency signal, and the positioning range of the mobile device is narrowed by the moving track and the moving status of the mobile device obtained according to the map information and in cooperation with the sensing feedback element, so as to decrease the drift and inaccuracy problem of the intensity of the radio frequency signal, increase the overall positioning accuracy, raise the positioning efficiency when the positioning method is applied in a large-scaled environment, and resolve the problem of positioning a user who is moving in a 3D space of a multi-story building.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for positioning a mobile device, comprising:
    generating a plurality of sample points based on a prior location point of the mobile device according to a prior probability distribution associated with the prior location point;
    obtaining a current moving track or a current moving status of the mobile device and updating the sample points according to at least one of the current moving track and the current moving status; and
    obtaining a current estimated position based on a radio frequency signal, generating a current probability distribution of the sample points corresponding to the radio frequency signal or the current estimated position to obtain corresponding weights of the updated sample points, and determining a current location point of the mobile device according to the weights and the current probability distribution of the sample points;

wherein the current moving track of the mobile device is obtained by utilizing an inertia element or a sensing element, or calculating a moving vector of the mobile device.

2. The method for positioning a mobile device according to claim 1, further comprising:
generating the sample points based on an initial point of the mobile device, wherein the sample points corresponding to the initial point have the same weights;
randomly updating the sample points; and
obtaining an initial estimated position based on the radio frequency signal, generating an initial probability distribution of the sample points corresponding to the radio frequency signal or the initial estimated position to obtain corresponding weights of the updated sample points, and obtaining a first location point of the mobile device according to the weights and the initial probability distribution of the sample points.

3. The method for positioning a mobile device according to claim 1, further comprising:
determining whether moving paths of the sample points or results are logical according to map information after the sample points are updated; and
removing the sample points corresponding to illogical paths if the moving paths of the sample points or the results are illogical.

4. The method for positioning a mobile device according to claim 1, wherein the current moving track is a moving track of the mobile device on a 2D plane or in a 3D space.

5. The method for positioning a mobile device according to claim 1, further comprising:
analyzing the obtained current moving track to obtain the current moving status, and adjusting the sample points according to the current moving track and the current moving status.

6. The method for positioning a mobile device according to claim 1, further comprising:
Updating the sample points according to the association between the obtained current moving track and map information.

7. The method for positioning a mobile device according to claim 1, wherein the radio frequency signal is one of a global positioning system (GPS) signal, a wireless network signal, a wireless communication signal and a Bluetooth signal.

8. A mobile device positioning apparatus, comprising:
a receiver for receiving a radio frequency signal;
a sensing feedback unit for obtaining a current moving track or a current moving status of the mobile device; and
a processor coupled to the receiver and the sensing feedback unit;
wherein, the processor generates a plurality of sample points based on a prior location point of the mobile device according to a prior probability distribution associated with the prior location point, updates the sample points according to at least one of the current moving track and the current moving status, determines a current estimated position based on the radio frequency signal, generates a current probability distribution of the sample points corresponding to the radio frequency signal or the current estimated position to obtain corresponding weights of the updated sample points, and determines a current location point of the mobile device according to the weights and the current probability distribution of the sample points;
wherein the sensing feedback unit is an inertia element or a sensing element for obtaining the current moving track of the mobile device.

9. The mobile device positioning apparatus according to claim 8, wherein the processor further generates the sample points based on an initial point of the mobile device, the sample points corresponding to the initial point have the same weights, the processor randomly updates the sample points, determines an initial estimated position based on the radio frequency signal, generates the sample points corresponding to the radio frequency signal or an initial probability distribution of the initial estimated position to obtain corresponding weights of the updated sample points, and determines a first location point of the mobile device according to the weights and distribution of the sample points.

10. The mobile device positioning apparatus according to claim 8, further comprising:
a map information unit coupled to the processor for providing map information;
wherein, after the sample points are updated, the processor determines whether moving paths of the sample points or results are logical according to the map information, and if the moving paths of the sample points or the results are illogical, then the processor removes the sample points corresponding to illogical paths.

11. The mobile device positioning apparatus according to claim 8, wherein the receiver is further for receiving map information, and after the sample points are updated, the processor determines whether moving paths of the sample points or results are logical according to the map information, and if the moving paths of the sample points or the results are illogical, then the processor removes the sample points corresponding to illogical paths.

12. The mobile device positioning apparatus according to claim 8, wherein the current moving track is a moving track of the mobile device on a 2D plane or in a 3D space.

13. The mobile device positioning apparatus according to claim 8, wherein the processor further analyzes the obtained current moving track to obtain the current moving status, and adjusts the sample points according to the current moving track and the current moving status.

14. The mobile device positioning apparatus according to claim 8, further comprising:
a map information unit coupled to the processor for providing map information;
wherein, the processor further updates the sample points according to the association between the current moving track and the map information.

15. The mobile device positioning apparatus according to claim 8, wherein the receiver is further for receiving map information, the processor further updates the sample points according to the association between the current moving track and the map information.

16. The mobile device positioning apparatus according to claim 8, wherein the radio frequency signal is one of a GPS signal, a wireless network signal, a wireless communication signal and a Bluetooth signal.

* * * * *